United States Patent [19]
Lendaro

[11] Patent Number: 4,868,466
[45] Date of Patent: Sep. 19, 1989

[54] POWER SUPPLY FOR A TELEVISION APPARATUS

[75] Inventor: Jeffery B. Lendaro, Noblesville, Ind.

[73] Assignee: RCA Licensing Corporation, Princeton, N.J.

[21] Appl. No.: 174,927

[22] Filed: Mar. 29, 1988

[51] Int. Cl.$^4$ .......................................... H01J 29/70
[52] U.S. Cl. ..................................... 315/411; 315/408
[58] Field of Search ............................... 315/411, 408

[56] References Cited

U.S. PATENT DOCUMENTS

| | | |
|---|---|---|
| 4,392,090 | 7/1983 | Rinehart et al. . |
| 4,500,923 | 2/1985 | Duval et al. . |
| 4,532,457 | 7/1985 | Haferl . |
| 4,641,064 | 2/1987 | Testin et al. ......................... 315/411 |
| 4,651,214 | 3/1987 | Rodriguez-Cavazos . |
| 4,656,399 | 4/1987 | Testin et al. ......................... 315/411 |
| 4,734,771 | 3/1988 | Lendaro et al. ..................... 315/411 |
| 4,737,851 | 4/1988 | Shanley, II et al. ................. 315/411 |
| 4,761,723 | 8/1988 | Lendaro .............................. 315/411 |

OTHER PUBLICATIONS

A service manual entitled Color Television Basic Service Data for RCA television chassis CTC 111 series published by RCA Corporation, Consumer Electronics, Indianapolis, Ind., dated 1981, FIGS. 31, 32 and the cover sheet being enclosed.
Copending U.S. patent application No. 014,855 entitled Power Supply Regulator for Television in the name of Lendaro, the applicant of the above-captioned patent application, filed 2/27/87.

Primary Examiner—Thomas H. Tarcza
Assistant Examiner—David Cain
Attorney, Agent, or Firm—Joseph S. Tripoli; Joseph J. Laks; Sammy S. Henig

[57] ABSTRACT

During a power-up mode of a television receiver power supply, a first run supply voltage is generated by rectifying a retrace voltage in a flyback transformer of a horizontal output stage of the television receiver. The rectified voltage is coupled through a resistor and a diode to a power supply voltage receiving terminal of a load circuit. A voltage regulator that includes a pass transistor regulates the voltage at the terminal during both the power-up and standby modes. During the power-up mode, when the ambient temperature is higher than during the standby mode, the current in the transistor is lowered, as a result of a current that is coupled to the terminal via the diode. This reduces the power dissipation in the transistor during the power-up mode. A second transistor, having a base electrode that is coupled to the anode of the diode, generates a second run supply voltage that is temperature compensated at an emitter electrode of the transistor.

17 Claims, 1 Drawing Sheet

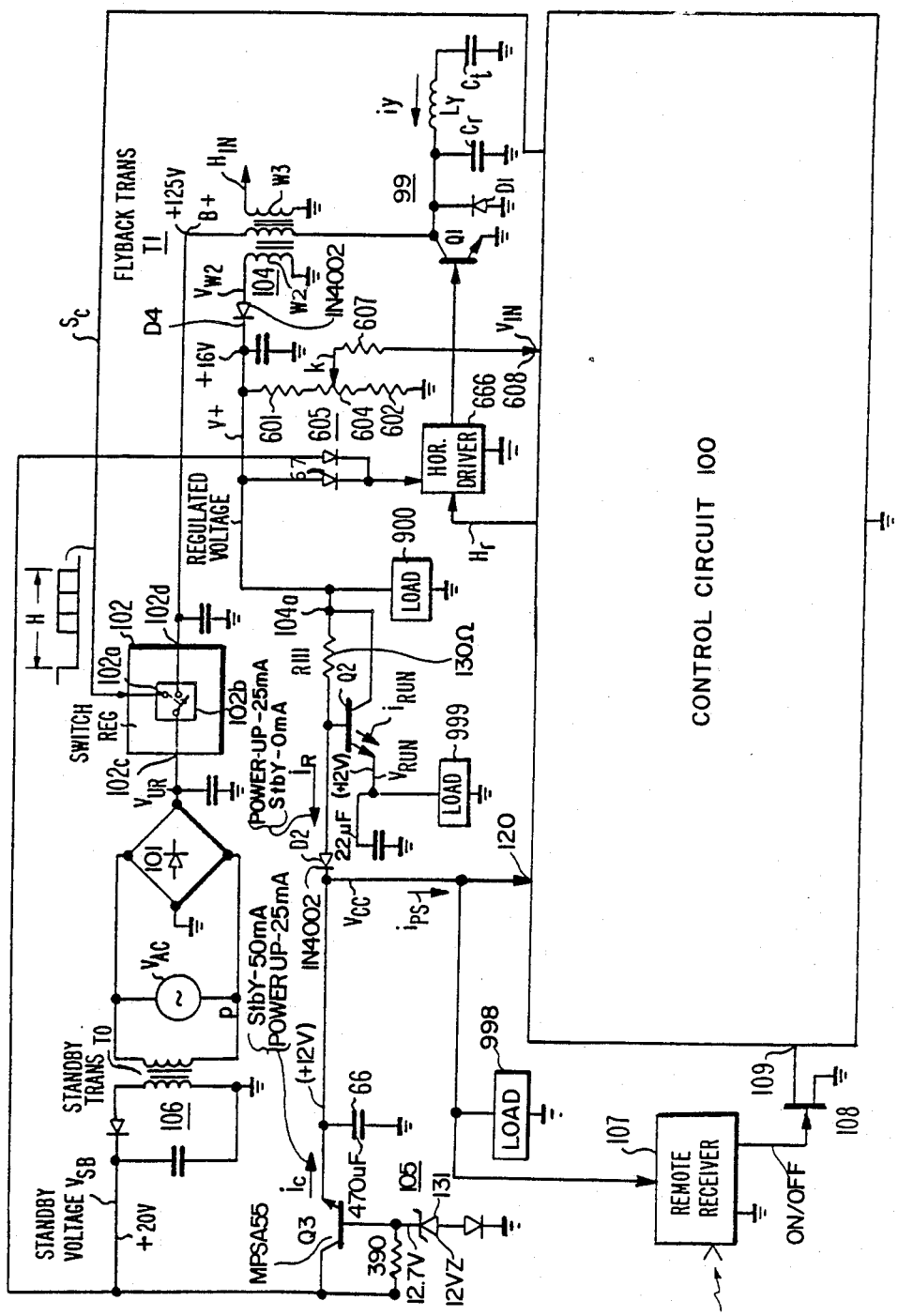

POWER SUPPLY FOR A TELEVISION APPARATUS

The invention relates to a power supply for supplying a supply voltage to circuitry of a television apparatus during, for example, both run and standby modes of operation of the power supply.

In a television receiver, for example, that is capable of operating in a standby mode in which power dissipation and eat generation in the television circuit components is low, a standby power supply is typically required for energizing the television circuitry that includes, for example, a remote control unit that enables start-up operation during a transition from the standby to the power-up mode.

A standby/power-up power supply, embodying the invention, includes a standby transformer having a primary winding that is coupled to an alternating current (AC) mains supply source. A voltage that is developed at a secondary winding of the transformer is rectified to produce a DC, energizing voltage. The energizing voltage is applied to a supply voltage receiving terminal of the television circuitry that is required to be energized during the standby mode via a series regulator; whereas, during the power-up mode, a run-mode power supply that is inoperative during the standby mode provides a portion of the energizing current. The series regulator regulates the energizing voltage at such terminal during both the power-up and standby modes.

It may be desirable to reduce the power dissipation in the regulator during the power-up mode when the ambient temperature caused by power dissipation in the various circuit-components of the television receiver is higher than during the standby mode. Thereby, the temperature at a P-N junction of a series coupled transistor of the regulator is prevented from exceeding a safe level, during the power-up mode.

In accordance with an aspect of the invention, a television apparatus power supply generates a first supply voltage during a normal operation power-up mode of the power supply. A second supply voltage is coupled via a voltage regulator to a first terminal of a first load circuit to develop a first terminal supply voltage and to supply a first terminal supply current prior to operation in the power-up mode. A first portion of the first terminal supply current is applied from the voltage regulator during the power-up mode. A switching arrangement couples, during the power-up mode, the first supply voltage to the first terminal to provide a second portion of the current that is applied to the first load circuit via the first terminal. The voltage regulator that is coupled to the first terminal regulates the first terminal supply voltage during both the standby and the power-up modes.

The regulated, energizing voltage, developed at the supply voltage receiving terminal during the power-up mode, may be at, for example, the same level that is required by, for example, other integrated circuits of the television receiver. Therefore, it may be desirable to utilize such regulated energizing voltage to regulate a third supply voltage that is coupled to various other circuits of the television receiver and that provides a corresponding supply current during operation in the power-up mode.

It may be desirable to obtain such regulation of the third supply voltage with as few circuit components as possible. Furthermore, it may be desirable that, during operation in the standby mode, not to have the third supply voltage generating and regulating circuitry load the regulator that is coupled to the supply voltage receiving terminal of the television circuitry. Reduction of the supply current that is required from the regulator during the standby mode is desirable so as to reduce the cost of the standby transformer.

In accordance with another aspect of the invention, the regulated first terminal supply voltage is coupled through the switching arrangement, during the power-up mode, to a second terminal of the switching arrangement to regulate at the second terminal the third supply voltage that, prior to the operation in the power-up mode, is isolated by the switching arrangement from the first terminal.

In accordance with a further aspect of the invention, a power supply of a television apparatus includes a source of an input supply voltage and a voltage regulator coupled to the source of input supply voltage for developing at an output terminal of the regulator a first output supply voltage both during a standby mode and during a power-up mode of the power supply. A load circuit of the television apparatus is coupled to the output terminal of the regulator and is energized by the first output supply voltage. A first supply current that is generated in the regulator is coupled to the load circuit to form at least a portion of a load current that flows in the load circuit during the standby mode. A source of a run supply voltage is responsive to an on/off control signal for generating a second supply current during operation in the power-up mode. A switching arrangement responsive to the on/off control signal forms a current path between the source of the run supply voltage and the output terminal of the regulator when the switching arrangement is conductive for coupling through the switching arrangement the second supply current to the load circuit during the power-up mode. The second supply current causes a reduction in the first supply current from the regulator such that both the second supply current and the first supply current form corresponding substantial portions of the load current during the power-up mode.

The sole FIGURE illustrates a standby/power-up television power supply including a supply regulator embodying an aspect of the invention.

The sole FIGURE illustrates a portion of a television receiver incorporating a control circuit 100. Such portion of the television receiver includes a bridge rectifier 101 that rectifies a mains supply voltage $V_{AC}$ to produce a DC, unregulated voltage $V_{UR}$. A conventionally designed output stage, or switch regulator 102 that may include a silicon controlled rectifier (SCR) produces, in a power-up or run mode, a regulated voltage B+ that is coupled to a flyback transformer T1. An input terminal 102c of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$, at the horizontal rate $f_H$ that is produced in a horizontal processor portion, not shown in the FIGURE, of control circuit 100, is coupled via a horizontal driver 666 to the base electrode of transistor Q1. Signal $H_r$ controls the switching of transistor Q1 to generate a deflection current $i_y$ in a deflection winding $L_Y$ of output stage 99. A retrace voltage $V_{w2}$ is produced in a conventional manner across a winding W2 of transformer T1 in each retrace interval of each horizontal period H. Each retrace interval occurs immediately after transistor Q1 becomes nonconductive. A DC, run-mode supply voltage V+, that is illustratively +16 volts, is produced by rectifying voltage $V_{w2}$ in a rectifier arrangement 104 that is coupled to winding W2. Voltage V+ is also coupled to various circuits of the receiver to provide them with energy during a power-up mode of the television receiver. Such circuits are depicted as a load 900.

Voltage V+ is also coupled to a switch mode regulator and pre-driver portion, not shown in the FIGURE, of control circuit 100 to provide a feedback signal. A pulse width modulated signal $S_c$ is generated that controls the duration, in each horizontal interval H, in which switch regulator 102 is conductive. The duty cycle of signal $S_c$ varies, in accordance with a difference between a voltage that is proportional to voltage V+ and a reference voltage that may be produced in a conventional manner. Signal $S_c$ causes regulated voltage B+ to be at a predetermined DC voltage level such as, illustratively, +125 volts. Signals $S_c$ and $H_r$ and voltages B+ and V+ are produced, illustratively, when control circuit 100 operates in the power-up mode, but are not produced during television receiver standby-mode operation.

A standby transformer TO steps down voltage $V_{AC}$. The stepped down voltage is rectified in a rectifier arrangement 106 to produce a standby voltage $V_{SB}$. Standby voltage $V_{SB}$ is coupled to an energizing voltage receiving terminal 120 of control circuit 100 through a series pass regulator 105 that includes a transistor Q3 having a base electrode that is coupled to a cathode of a zener diode 31. Transistor Q3 produces at its emitter an energizing voltage $V_{cc}$ which is filtered by capacitor 66. Voltage $V_{cc}$ is coupled to terminal 120 of control circuit 100. Regulated voltage V+ is coupled to $V_{cc}$ terminal via a resistor R111, that is coupled in series with a diode $\overline{D2}$, to supply a corresponding portion of a current $i_{ps}$ from voltage V+ only when control circuit 100 operates in the power-up mode. Diode D2 that is nonconductive during the standby mode prevents current drain via load 900 and load 999 from standby transformer TO.

Voltage $V_{cc}$ is coupled to a remote receiver 107 to provide the operating voltage of remote receiver 107. Remote receiver 107 generates an ON/OFF signal that is coupled via a drain of an MOS transistor 108 to control circuit 100. When transistor 108 is conductive, a low impedance is formed at terminal 109 of control circuit 100. The low impedance occurs after, for example, a user initiates a power-on command via an infrared communication link that causes a start-up interval to occur. When transistor 108 becomes conductive, it causes a horizontal oscillator, not shown in the FIGURE, to begin operating. Consequently, signals $H_r$ and $S_c$ are generated.

At the beginning of the start-up interval, horizontal driver 666 is energized by standby voltage $V_{SB}$ through a diode 67. A current $i_c$ of regulator 105 supplies, by itself, current $i_{ps}$ prior to operation in the power-up mode. Thus, regulator 105 provides the entire current requirement, such as 50 milliamperes, of control circuit 100 and of other television circuitry referred to herein as a load 998 prior to operation in the power-up mode. During the start-up interval, voltage V+, that was zero before, begins increasing. At the end of the start-up interval, when voltage V+ is sufficiently large, it causes diode D2 to turn-on for developing voltage $V_{cc}$ in the power-up mode from voltage V+.

In accordance with an aspect of the invention, diode D2 supplies a current $i_R$ that is combined with current $i_c$ to supply current $i_{ps}$ during the power-up mode such that the contribution of each to current $i_{ps}$ is significant. In the example shown in the FIGURE each of current, $i_c$ and $i_R$ contributes 50% to current $i_{ps}$ during the power-up mode. Because of the flow of current $i_R$ to terminal 120, current $i_c$ that is supplied by regulator 105 is, advantageously, significantly reduced relative to its value during standby. At the same time, voltage $V_{cc}$ is maintained regulated by regulator 105.

During run-mode or power-up mode operation, the ambient temperature increases inside the cabinet of the television receiver that provides the housing for the circuitry shown in the FIGURE, relative to the inside temperature during standby. The increase in ambient temperature is caused by the heat dissipation of the television receiver circuitry that has become powered up during run-mode operation. The rise in ambient temperature would tend to cause a temperature rise in transistor Q3, requiring a more massive heat sinking structure for the transistor.

In accordance with a feature of the invention, heat dissipation in transistor Q3 is reduced during run-mode relative to that during standby mode. The reduction in the power dissipation enables operating transistor Q3 at, advantageously, approximately the same collector P-N junction temperature during both the power-up and the standby modes. Advantageously, by utilizing current $i_R$ to provide the corresponding portion of current $i_{ps}$, a heat conduction arrangement for transistor Q3, such as, for example, a heat sink may not be required.

In the power-up mode, the television receiver is fully operative. Conversely, after a power-off command is initiated by the user, transistor 108 becomes nonconductive and forms a high impedance circuit at terminal 109 that causes a standby mode to occur. In the standby mode, deflection current $i_y$ and the raster scanning on the display device of the television receiver are turned-off.

Input supply current $i_{ps}$ is coupled through terminal 120 for providing the energizing current of control circuit 100 and of remote receiver 107. During operation in the power-up mode, a significant portion of current $i_{ps}$ is supplied by rectifier arrangement 104 through diode D2 and D4; whereas, during operation in the standby mode, current $i_{ps}$ is supplied entirely from standby transformer 106 via regulator 105.

Various circuits in the receiver such as, for example, a second IC of the television receiver that provides video processing, that are depicted as a load 999 in the FIGURE, may require, during the power-up mode, a regulated supply voltage, that is depicted as a voltage $V_{RUN}$ in the FIGURE. Voltage $V_{RUN}$ may be required to be at a level that is equal to that of, for example, voltage $V_{cc}$. It may be desirable to utilize voltage $V_{cc}$ that is regulated by regulator 105 to also provide regulation of voltage $V_{RUN}$.

Therefore, transistor Q2 having a collector electrode that is coupled to voltage V+ produces regulated voltage $V_{RUN}$ at an emitter electrode of transistor Q2. The base electrode of transistor Q2 is coupled to the anode of diode D2. The base current of transistor Q2 is provided by resistor R111. The forward voltage drop across diode D2 is summed with voltage $V_{cc}$ to produce at the base of transistor Q2 a voltage that is higher by diode D2 voltage drop that is, approximately, 0.7 volts in a silicon diode. Consequently, voltage $V_{RUN}$ that is smaller than the base voltage of transistor Q2 by approximately the same voltage drop that is developed across diode D2 is equal to voltage $V_{cc}$. A current $i_{RUN}$ that is supplied via transistor Q2 to load 999 is outside the current path of current $i_{ps}$ that is coupled to control circuit 100 via terminal 120.

Temperature related changes of the voltage across the base-emitter junction of transistor Q2, are temperature compensated by diode D2 to render volta $V_{RUN}$ regulated and temperature compensated. Using resistor R111, diode D2 and regulator 105 for controlling transistor Q2 to obtain regulation of voltage $V_{RUN}$, advantageously, eliminates the need for separate resistor, diode and regulator that would have, otherwise, been required for providing the base voltage of transistor Q2.

During operation in the power-up mode, voltage V+, that is coupled via resistor R111, causes diode D2 to be conductive. Resistor R111 is required for developing a voltage drop that is equal to the difference between voltage V+ and a sum voltage of voltage $V_{cc}$ and the forward voltage drop across diode D2.

During the standby mode, it is undesirable to load standby transformer TO by any of load 900, load 999, resistor R111 and transistor Q2, because the cost of transformer TO is directly related to the standby current requirement from, or loading of, transformer TO. Diode D2, advantageously, prevents the loading of transformer TO during the start-up interval, as long as voltage V+ is not sufficiently large to turn on diode D2. Similarly, during the standby mode, each of load 900, load 999, resistor R111 and transistor Q2 is, advantageously, isolated from standby transformer TO by diode D2 that is switched off.

What is claimed is:

1. A power supply of a television apparatus, comprising:
   a source of an input supply voltage;
   a voltage regulator coupled to said source of input supply voltage for developing at an output terminal of said regulator a first output supply voltage both during a standby mode and during a power-up mode of said power supply;
   a load circuit of said television apparatus coupled to said output terminal of said regulator and being energized by said first output supply voltage such that a first supply current that is generated in said regulator is coupled to said load circuit to form at least a portion of a load current that flows in said load circuit during said standby mode;
   a source of an on/off control signal;
   a source of a run supply voltage responsive to said on/off control signal for generating a second supply current during operation in said power-up mode; and
   switching means, responsive to said on/off control signal, and forming a main current path between said source of said run supply voltage and said output terminal of said regulator when said switching means is conductive for coupling therethrough said second supply current to said load circuit during said power-up mode that causes a reduction in said first supply current from said regulator such that both said second supply current and said first supply current form corresponding substantial portions of said load current during said power-up mode.

2. An apparatus according to claim 1 wherein said switching means also couples, during said power-up mode, said first output supply voltage that is developed at said output terminal of said regulator to a second output terminal to regulate at said second output terminal a second output supply voltage that during said standby mode is isolated by said switching means from said output terminal of said regulator.

3. A power supply according to claim 2 wherein said switching means comprises a diode having a first terminal that is coupled to said source of said run supply voltage and a second terminal that is coupled to said output terminal of said regulator.

4. A power supply according to claim 3 wherein said switching means further comprises, a transistor, wherein said diode is interposed between a control electrode of said transistor and said output terminal of said regulator and wherein a resistor is coupled between said control electrode of said transistor and between said source of said run supply voltage that causes said diode to be conductive only when said run supply voltage is generated.

5. An apparatus according to claim 4 wherein said diode isolates said source of said run supply voltage from said regulator prior to said power-up mode.

6. An apparatus according to claim 5 wherein a second load is coupled to a main current conducting electrode of said transistor and wherein said diode isolates said regulator from said second load prior to said mode when said run supply voltage is turned-off.

7. An apparatus according to claim 4 wherein said diode provides temperature compensation for variations of a base-emitter junction voltage in said transistor to produce a temperature compensated third output supply voltage at an emitter electrode of said transistor.

8. An apparatus according to claim 1 wherein said source of said input supply voltage comprises a step-down transformer coupled to a main supply voltage, and a rectifier having an input terminal that is coupled to said step-down transformer for generating said input supply voltage by rectifying a voltage that is developed at said step-down transformer.

9. An apparatus according to claim 1 wherein said source of said run supply voltage comprises a deflection circuit responsive to a control signal at a frequency that is related to a deflection frequency.

10. An apparatus according to claim 9 wherein said source of said run supply voltage further comprises a flyback transformer for generating in a winding of said flyback transformer a voltage at a frequency that is related to said deflection frequency and a rectifier coupled to said winding of said flyback transformer for rectifying a voltage that is generated in said winding to generate said run supply voltage.

11. An apparatus according to claim 1 wherein said on/off control signal is generated in a remote receiver.

12. A power supply according to claim 1 wherein said regulator comprises a transistor having a first main current conducting electrode that is coupled to said source of said input supply voltage, having a second main current conducting electrode that is coupled to said output terminal of said regulator and having a control electrode that is coupled to a source of a reference signal at a reference level that causes said first output supply voltage to be maintained at substantially the same level both during and prior to said power-up mode.

13. A power supply according to claim 12 wherein said regulator further comprises a zener diode such that said reference level is produced at a terminal of said zener diode.

14. A power supply according to claim 12 wherein, during said power-up mode when said second supply current is generated, said second supply current causes an emitter current that flows an emitter electrode thereof to decrease significantly relative to its value prior to said power-up mode.

15. A power supply according to claim 1 wherein, during said power-up mode, when an ambient temperature inside an enclosure that includes said television apparatus is higher, said first supply current that is lower causes power dissipation in said regulator to be smaller than prior to said power-up mode, to provide temperature compensation in a P-N junction of a transistor that is included in said regulator.

16. A television deflection apparatus, comprising:
a source of an input supply voltage;
a voltage regulator coupled to said source of input supply voltage for developing at an output terminal of said regulator a first output supply voltage both during standby mode and during a power-up mode of said power supply;
a load circuit of said television apparatus coupled to said output terminal of said regulator and being energized by said first output supply voltage such that a first supply current that is generated in said regulator is coupled to said load circuit to form at least a portion of a load current that flows in said load circuit during said standby mode;
a source of an on/off control signal;
a deflection winding;
a deflection circuit output stage for generating a deflection current in said deflection winding;
a source of a run supply voltage coupled to said deflection circuit output stage and responsive to said on/off control signal for generating a second supply current during operation in said power-up mode; and
switching means, responsive to said on/off control signal, and forming a main current path between said source of said run supply voltage and said output terminal of said regulator when said switching means is conductive for coupling therethrough said second supply current to said load circuit during said power-up mode that causes a reduction in said first supply current from said regulator such that both said second supply current and said first supply current form corresponding substantial portions of said load current during said power-up mode.

17. A power supply according to claim 1 or 16 wherein said voltage regulator comprises a series voltage regulator and wherein said first current flows through said voltage regulator.

* * * * *